Figure 1:
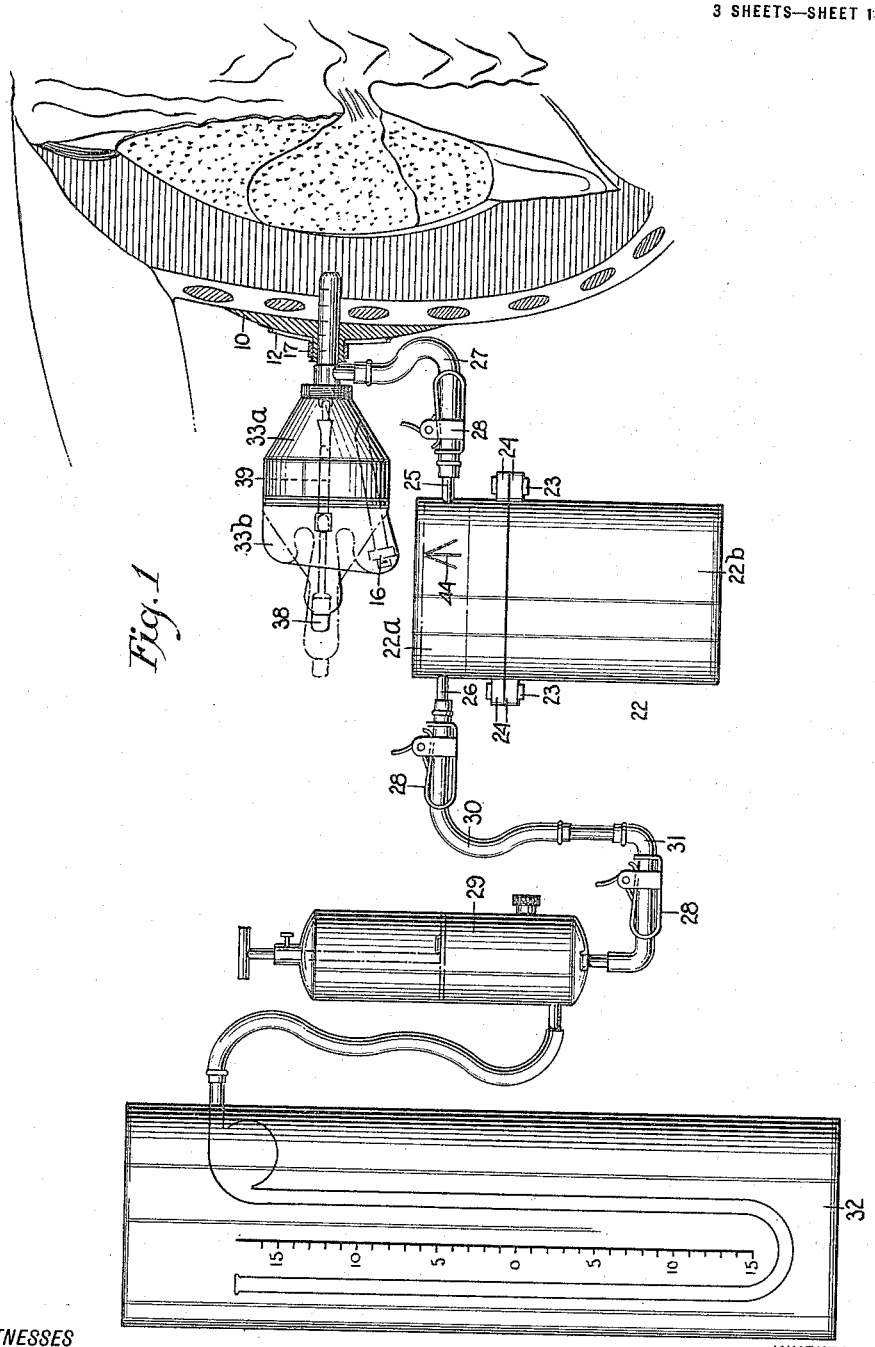

H. B. PHILIPS.
THERAPEUTIC APPARATUS.
APPLICATION FILED JAN. 22, 1915.

1,155,271.

Patented Sept. 28, 1915.
3 SHEETS—SHEET 1.

WITNESSES

INVENTOR
Herman B. Philips
BY
ATTORNEYS

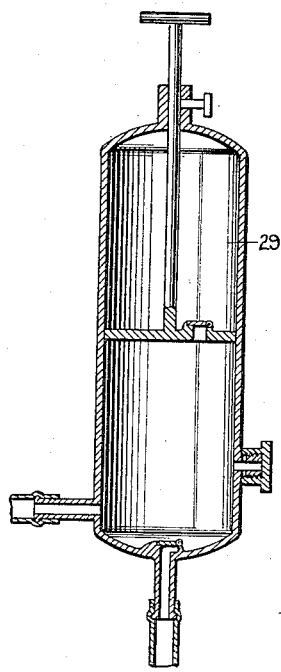
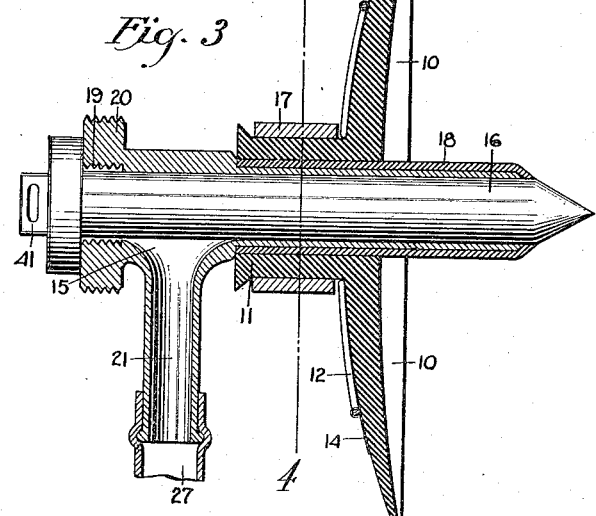
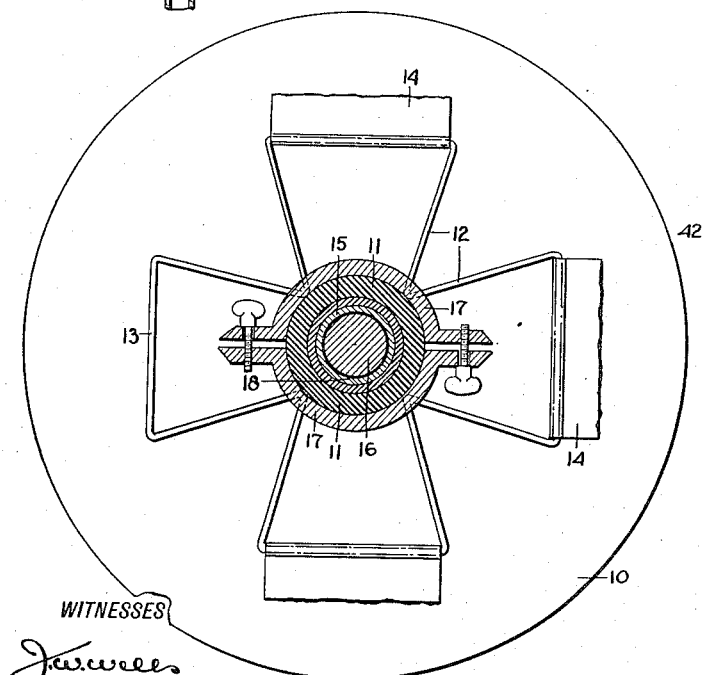
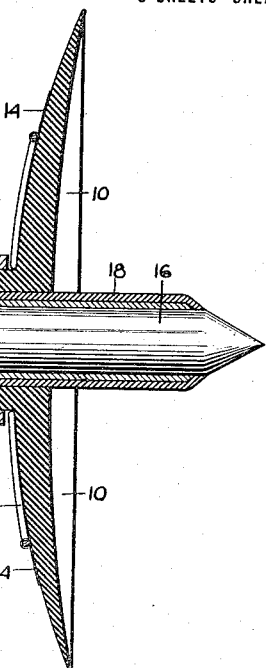

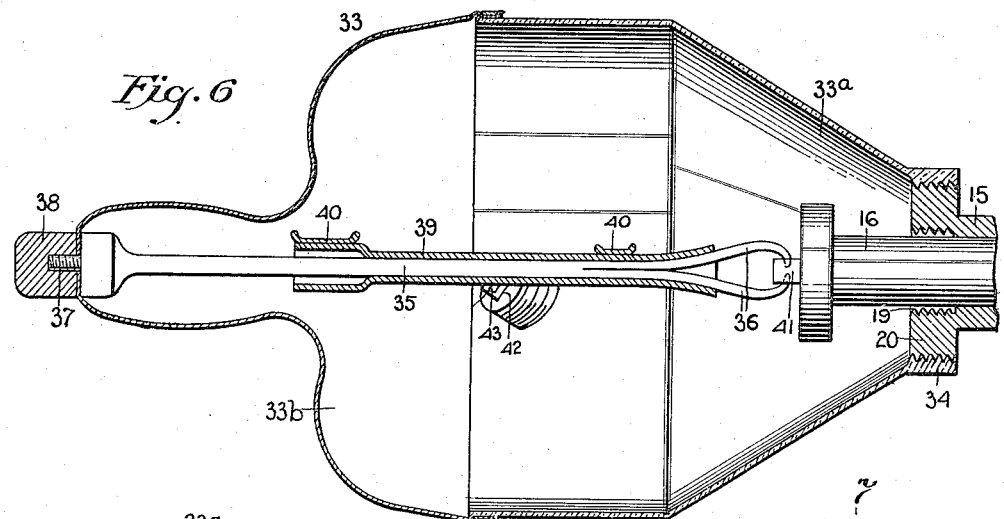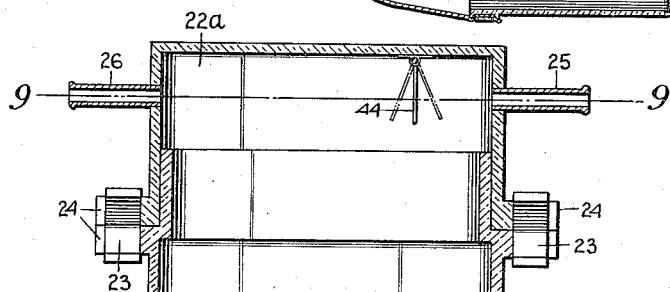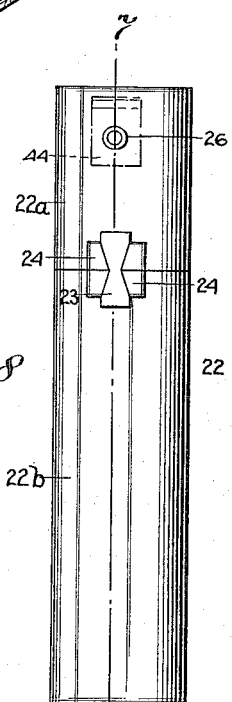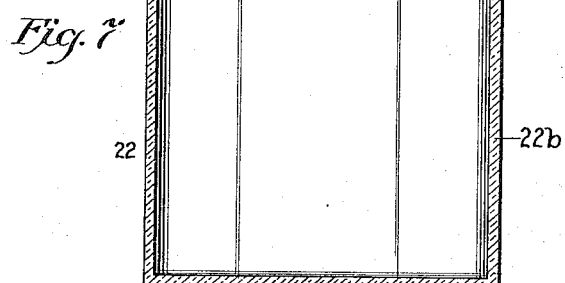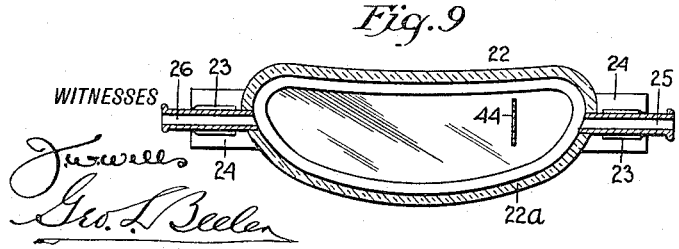

UNITED STATES PATENT OFFICE.

HERMAN B. PHILIPS, OF NEW YORK, N. Y., ASSIGNOR TO RALPH S. PHILIPS, OF NEW YORK, N. Y.

THERAPEUTIC APPARATUS.

1,155,271.   Specification of Letters Patent.   Patented Sept. 28, 1915.

Application filed January 22, 1915. Serial No. 3,713.

*To all whom it may concern:*

Be it known that I, HERMAN B. PHILIPS, a citizen of the United States, and a resident of the city of New York, borough of Manhattan, in the county and State of New York, have invented a new and Improved Therapeutic Apparatus, of which the following is a full, clear, and exact description.

This invention relates to therapeutic apparatus and has particular reference to devices adapted especially for the automatic drainage of empyema.

Among the objects of the invention is to provide a means for maintaining a desired negative pressure in the pleural cavity whereby the discharge of the pus is facilitated in a natural way and without danger of collapse of the lung.

Another object of the invention is to provide a means for securing the cannula in permanent position for the purposes of the apparatus without interfering with the desired negative pressure or requiring redressing of the wound.

A further object of the invention is to provide a means for the drainage of the pleural cavity which in most cases obviates the necessity for the resection of a rib.

A further object of the invention is to provide an apparatus suitable for the purpose indicated, which may be strapped in definite position to the person of an ambulating patient, means furthermore being provided whereby the cannula may be gradually withdrawn and yet held at varying depths in a secure manner.

A still further object of the invention is to provide means of manipulation whereby particles of fibrin or other matter tending to obstruct the drainage channel may be removed or withdrawn without disturbing the main connection with the patient and without disturbing the desired practically uniform negative pressure in the pleural cavity.

Another object of the invention is to provide an apparatus including an indicating device whereby it may at all times be observed whether the apparatus is in proper draining condition.

The foregoing and many other objects of the invention will be hereinafter more fully described and claimed and illustrated in the drawings forming a part of this specification in which like characters of reference indicate corresponding parts in all the views, and in which—

Figure 1 is a side elevation, somewhat diagrammatic, of an apparatus embodying the principles of this invention, the same being shown in operative position; Fig. 2 is a vertical sectional view of an air pump suitable for use in connection with this device; Fig. 3 is a vertical longitudinal section of the cannula, trocar and attachment devices immediately associated therewith; Fig. 4 is a vertical transverse section on the line 4—4 of Fig. 3; Fig. 5 is a view similar to Fig. 3, but indicating the cannula with the trocar removed and the plug inserted, and also indicating the cannula adjusted outwardly from the position of Fig. 3; Fig. 6 is a horizontal longitudinal section of the forceps chamber and parts therein; Fig. 7 is a vertical section of the drainage receptacle or receiver, on the line 7—7 of Fig. 8; Fig. 8 is a side elevation of the same; and Fig. 9 is a transverse section on the line 9—9 of Fig. 7.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 a flexible cup, preferably of rubber and of a form suitable for clamping snugly against a patient, said cup being provided with a tubular neck 11 at its center.

At 12 I show a suitable guard or reinforcing member indicated as of open wire construction and cruciform in shape, the same being applied around the neck 11 and having its end portions bearing against the outer surface of the cup. The extremity of each end or wing of the guard is provided with a cross bar 13 to which a strap or section of adhesive tape 14 may be connected for the purpose of securing the parts in position.

At 15 I show a cannula with which coöperates a pointed trocar 16, the cannula being slidably fitted in and through the neck 11 of the cup, and it may be clamped in place at any desired depth by means of a clamp 17. The cannula is made preferably of metal or other suitable rigid material, and the inner end thereof is preferably covered by a sheath 18 of rubber or its equivalent, whereby a suitable grip is maintained thereon in connection with the neck 11. The outer end of the cannula is provided with an internally threaded socket 19 and an externally threaded flange 20. This member also is provided with a drainage nipple 21 extending laterally and downwardly from the outer portion thereof.

At 22 I show a peculiar form of drainage receiver or receptacle made preferably of glass, not only for sanitary reasons, but also to enable the interior thereof to be plainly seen at all times. This receptacle is made of two parts, namely, a top $22^a$ and a bottom $22^b$ detachably connected along a horizontal plane whereby the accumulations of pus therein may be removed whenever necessary. The means for connecting these parts is shown best in Figs. 7 and 8, and such means includes a pair of double wedges 23 coöperating with pairs of spaced lugs 24 formed on or secured to the meeting portions of the receptacle parts. Each of these wedges may be slipped directly into or out of place, making a quick and reliable securing means for the purpose set forth. The top $22^a$ is provided with a pair of nipples 25 and 26 arranged preferably on opposite sides or edges. The nipple 25 provides a means for connecting the receptacle to the nipple 23 of the cannula through a flexible hose 27 which preferably is provided with any suitable or well known form of clamp 28. The other nipple 26 provides means for connecting an air pump 29 through tubes 30 and 31 each provided with a clamp 28. Any suitable form of pressure gage or manometer 32 is connected to the air pump 29 to indicate the extent of negative pressure set up in the apparatus.

With the parts arranged as shown in Fig. 3 and connected as shown in Fig. 1 to the receptacle and negative pressure apparatus, the apparatus is made airtight and a negative pressure of say, minus 7 mm. of mercury is then produced. The cannula and trocar are then thrust into the intercostal space, preferably between the ribs. The trocar is then partially withdrawn. I then apply the airtight forceps chamber 33 comprising a glass cup $33^a$ and a flexible cup $33^b$, the connection being made through the threaded neck 34 upon the previously mentioned externally threaded flange 20 at the outer end of the cannula. The forceps chamber, among its many uses, serves to provide a means for manipulating various parts or appliances in connection with the cannula, not interfering with the dressing of the wound nor disturbing the pressure conditions. The cup $33^a$ is made of comparatively large size and of transparent material for the purpose of observing the operations which take place within it.

Included within the forceps chamber is a forceps device comprising a shank 35 having a pair of jaws 36 tending to spring apart at the inner end and connected at its outer end by means of a threaded stud 37 projecting beyond the outer surface of the outer end of the cup $33^b$ for a binding nut 38, making a permanent and airtight connection between the forceps and the cup structure. The forceps device includes also a sleeve 39 having finger pieces 40 on one side and coöperating with the jaws 36 to force them together when the sleeve is forced inwardly along the shank 35. The trocar is provided with an apertured lug 41 at its outer end which is adapted to be grasped by the jaws 36 of the forceps after the operator grasps and collapses the cup $33^b$. By compression and invagination of the cup $33^b$ at the time the connection between the forceps chamber and the cannula is made, it results in insuring that the negative pressure created in the apparatus will not be materially lowered by reason of the normal air pressure within the air chamber. A plug 42, having previously been inserted in the center of the chamber 33, is then grasped by the forceps through a lug 43 after the trocar is withdrawn from the cannula. The plug is then screwed into the socket 19 above described, effectually closing the outer end of the bore of the cannula, leaving such bore open, however, to the lateral nipple 21 leading toward the receptacle 22. Assuming that the negative pressure apparatus is still connected with the receptacle, the degree of pressure resulting at this time in the pleural cavity may plainly be observed and corrected if necessary. With the tube 30 clamped shut by the clamp 28 applied thereto, the tube 31 may be disconnected if desired, as may also the forceps chamber leaving the receptacle connected through the open tube 27 to the cannula. This condition of the apparatus may obtain for a day or longer without readjustment. When the accumulations in the receptacle so demand, the clamp 28 may close the tube 27 when the lower portion $22^b$ of the receptacle may be disconnected and emptied. After reconnection and the required degree of negative pressure is introduced therein by the air pump, the tube 27 will again be opened, no disturbance or rearrangement, however, of the cannula being required for these purposes.

Within the upper portion $22^a$ of the receptacle is delicately pivoted a pendent wing 44 adapted to vibrate toward and from the nipple 25, said wing being so mounted as to project across the path of the air currents passing in either direction through the nipple 25 and tube 27. In other words, while the apparatus is in proper operation with the tubes freely open, the normal lung action due to respiration causes vibration of the indicator owing to the expansion and contraction of the pleural chamber. When, therefore, it is observed that the indicator wing 44 ceases to vibrate in harmony with the lung action, it is known immediately that there is an obstruction at the mouth of the cannula due to some floating particle of fibrin or the like. The forceps chamber may then be employed as previously described for gaining access to the cannula for removing the obstruction. That is to say, the forceps may be employed to remove the plug 42, and then the forceps, together with the sleeve, are projected into the cannula, and by the relative longitudinal movement of the sleeve the jaws 36 may serve to grasp the floating body and withdraw it directly through the cannula, and then without first removing the forceps chamber the condition of the tubing may be observed by the behavior of the indicator 44.

I claim:—

1. In an apparatus of the character set forth, the combination of a cannula, a drainage receptacle connected to one side thereof, means to hold the cannula in draining connection with the patient, and means to produce negative atmospheric pressure in said receptacle and cannula.

2. The herein described therapeutic apparatus comprising, in combination, a cannula having a straight longitudinal bore and a lateral nipple extending therefrom, a receptacle connected to said nipple, means to hold the cannula in draining position, and means to close the outer end of said bore.

3. In a device of the kind set forth, the combination of a cup having a tubular neck, a cannula extending through said neck and cup, said cannula having a straight longitudinal bore, a trocar adapted to extend into and through said bore, means to grip the cannula at any desired depth in said cup neck, an airtight drainage receptacle in communication with the cannula bore, means to produce a negative atmospheric pressure in said receptacle and cannula, and means to withdraw the trocar and close the outer end of the cannula without disturbing the aforesaid negative pressure in the receptacle.

4. In therapeutic apparatus of the character set forth, the combination of a cannula having a nipple connected therewith, means to hold the cannula in definite position at any desired depth, an airtight receptacle connected in said nipple, and an indicator serving to show whether or not the passageway through the cannula to the receptacle is open.

5. In therapeutic apparatus of the character set forth, the combination of a cannula, means to hold the cannula in draining position, a drainage receptacle, a tubular connection between the receptacle and the cannula, and an indicator carried by the receptacle to show whether or not the passageway through the cannula to the receptacle is open.

6. In therapeutic apparatus of the character set forth, the combination of a cannula, means to hold the cannula in draining position at any desired depth, a drainage receptacle, a normally open tubular connection between the receptacle and the cannula, and an indicator within the receptacle responsive to the movement of air currents through the tubular connection and visible through the wall of the receptacle whereby the condition of the tubular connection may be observed.

7. The combination of a cannula having a straight tubular bore and a nipple communicating laterally therewith, means to hold the cannula in definite position with respect to the patient, an airtight chamber connected to the outer end of the cannula beyond the nipple, and means carried within said chamber for manipulating through said longitudinal bore.

8. The combination of a cannula composed of rigid material and having a straight longitudinal bore and a lateral nipple communicating therewith, means gripped about the cannula to hold it at any desired depth and in definite position, a removable plug closing the outer end of the bore beyond the nipple, an airtight chamber connected to the outer end of the cannula around the plug, and devices within the chamber serving to remove said plug and manipulate in and through said cannula while the attachment means for the cannula remain undisturbed.

9. The combination of a flexible cup having a central hole and an outwardly projecting neck surrounding the same, a metallic guard member operating against the outer surface of the cup contiguous to the neck through which the cup may be clamped to the patient, a cannula of rigid material projecting through said neck and cup hole, said cannula being provided with a flexible sheath adapted to contact with the inner surface of said neck, and compression means surrounding the neck and serving to hold the cannula at any desired depth with respect to the neck and cup.

10. The combination of a flexible cup having an integral outwardly projecting neck and a central hole therethrough, a guard member surrounding the neck and fitted against the outer surface of the cup, a cannula having a longitudinal central bore, a trocar fitted in and projecting through the cannula bore, said cannula and trocar being adapted to project inwardly through and in said neck hole, compression means surrounding the neck and serving to hold the cannula at any desired depth with respect to said neck, said cannula having its outer end provided with an internally threaded socket and an externally threaded flange, means connected to the cannula for producing therein a negative pressure, an airtight chamber connected to said flange around the outer end of the trocar, a plug carried within the chamber, and devices within the chamber for withdrawing the trocar and fitting said plug into said socket while said condition of negative pressure remains substantially undisturbed.

11. The combination of a cannula having an attachment device at its outer end and a nipple extending laterally therefrom adjacent the outer end, means to hold the cannula in definite position with respect to the pleura, drainage means connected to said nipple, means to produce in said cannula and pleura any desired degree of negative pressure, a trocar adapted to fit removably in said cannula, an airtight chamber removably connected to said attachment means at the outer end of the cannula, said chamber comprising a rigid transparent cup and a flexible cup connected thereto, and devices carried within the chamber and connected permanently to the flexible cup for removing the trocar from the cannula and manipulating in and through the cannula while the aforesaid condition of negative pressure remains substantially undisturbed.

In testimony whereof I have signed my name to this specification in the presence of two subscribing witnesses.

HERMAN B. PHILIPS.

Witnesses:
 GEO. L. BEELER,
 PHILIP D. ROLLHAUS.

Copies of this patent may be obtained for five cents each, by addressing the "Commissioner of Patents, Washington, D. C."